Figure 1:
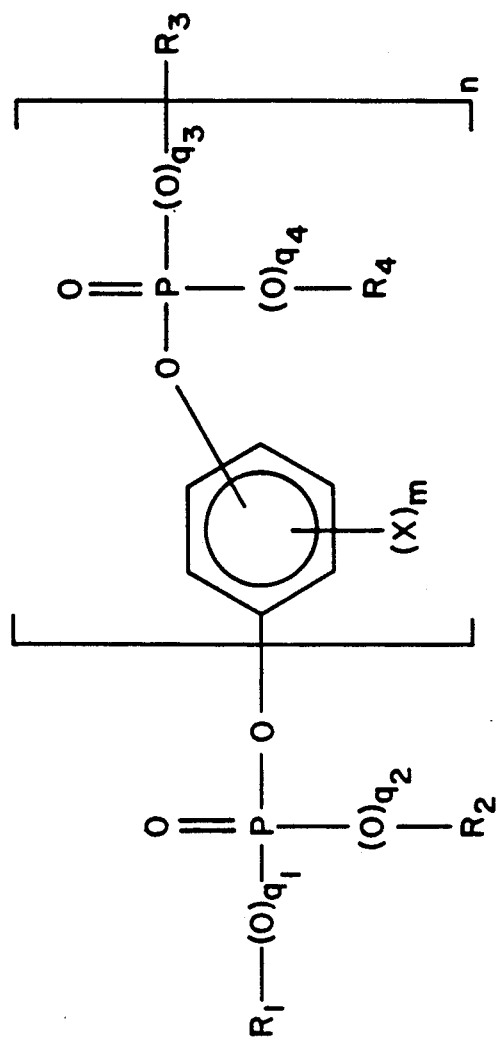
Figure 2:
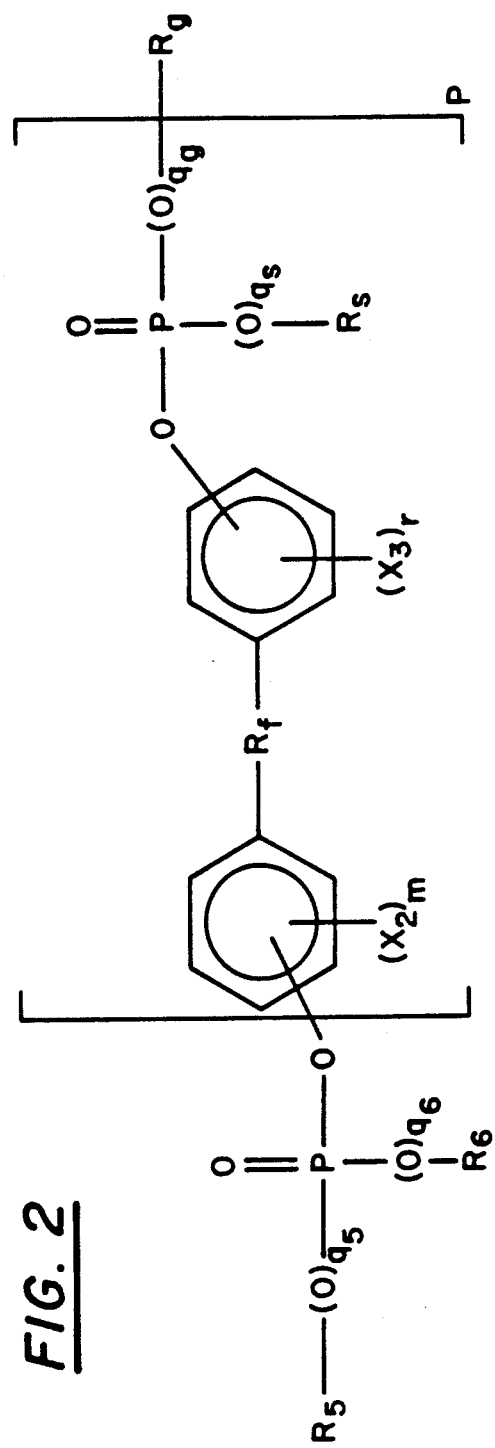
Figure 3:
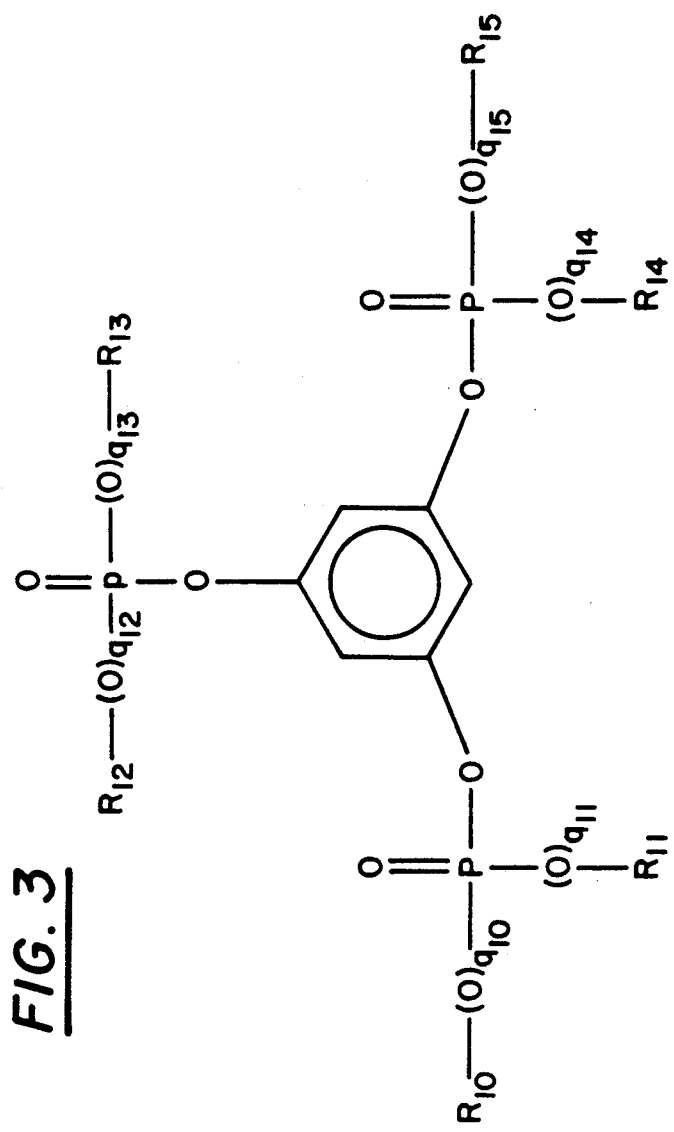
Figure 4:
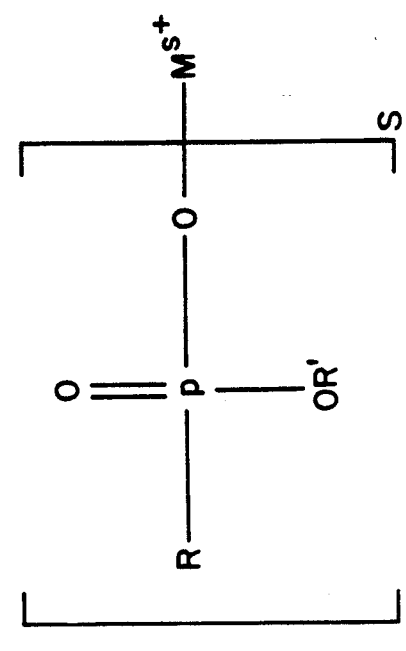

United States Patent [19]

Truyen

[11] Patent Number: 5,290,836
[45] Date of Patent: Mar. 1, 1994

[54] FLAME-RETARDANT POLYMER COMPOSITION

[75] Inventor: Jan H. Truyen, Heerlen, Netherlands

[73] Assignee: DSM N.V., Netherlands

[21] Appl. No.: 965,020

[22] Filed: Oct. 23, 1992

[30] Foreign Application Priority Data

Oct. 25, 1991 [NL] Netherlands ............... 9101794
Feb. 14, 1992 [NL] Netherlands ............... 9200269

[51] Int. Cl.$^5$ .................. C08K 5/52; C08K 5/521
[52] U.S. Cl. .................. 524/123; 524/125; 524/126; 524/127; 524/139; 524/504
[58] Field of Search ........... 524/123, 125, 126, 127, 524/139, 504

[56] References Cited

U.S. PATENT DOCUMENTS 4,632,946 12/1986 Muench et al. ............... 524/509

FOREIGN PATENT DOCUMENTS 2043083 10/1980 United Kingdom .

Primary Examiner—Kriellion S. Morgan
Attorney, Agent, or Firm—Cushman, Darby & Cushman

[57] ABSTRACT

Polymer composition comprising a copolymer of a vinylaromatic compound, a vinyl cyanide and, optionally, a third monomer which copolymer is grafted on a rubber, a flame-retardant phosphorus compound and a charforming component, characterised in that the polymer composition also comprises a polymer P which comprises 1-100 wt. % monomeric units with the following structure, the wt. % being relative to said polymer P

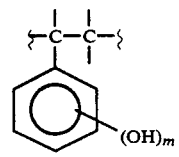

where m = 1-5.

This polymer composition shows improved flame-retardant properties as a result of synergism with respect to the flame-retardant properties between the charformer and polymer P.

19 Claims, 2 Drawing Sheets

FLAME-RETARDANT POLYMER COMPOSITION

The invention relates to a polymer composition comprising a copolymer of a vinylaromatic compound, a vinyl cyanide and, optionally, a third monomer which copolymer is grafted on a rubber, a flame-retardant phosphorus compound and a charforming component.

Such a composition is shown from DE-A-3.401.835. This publication described a polymer composition with good flame-retardant properties based on a thermoplastic graft copolymer, a charforming novolak resin, a compound containing phosphorus and melamine. The solid, non-melting melamine particles tend to exude in processing, as a result of which the melamine is no longer homogeneously dispersed in the polymer composition. This causes an undesired reduction in the flame-retardant properties. In addition, the surface sows irregularities that are the result of the exudation of the melamine: crystals are formed at the surface (blooming).

The object of the invention is to provide a polymer composition with improved flame-retardant properties, whereby drawbacks are avoided.

This object is achieved because the polymer composition according to the first aliena also comprises a polymer P, which comprises 1-100 wt. % monomeric units with the following structure, the wt. % being relative to said polymer P

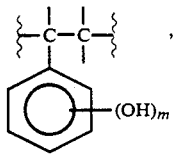

where $m = 1-5$.

It has been found that the addition of polymer P to the polymer composition results in a substantial reduction in the burning time of the polymer composition according to the invention. Polymer P mixes well with the graft copolymer and remains dispersed in the overall polymer composition in processing.

It has also been found that this substantial reduction is the result of synergism with respect to the flame-retardant properties between the charformer on the one hand and polymer P on the other. In that way it has been found that with a polymer composition according to the invention which contains relatively small amounts of flame-retardant phosphorus compound, charforming component and polymer P it is possible to realize the desired flame-retardant properties without affecting the intrinsic properties of the graft copolymer too much.

A suitable polymer composition according to the invention comprises, in addition to the graft copolymer:
(a) 0.1–25 wt. % of a flame-retardant phosphorus compound,
(b) 0.1–30 wt. % of a charforming component and
(c) 0.1–40 wt. % polymer P, the wt. % being relative to the total amount of component (a), component (b), component (c) and the graft copolymer.

The graft copolymers which can be used in a polymer composition according to the invention can be synthesized using generally known methods. Examples of such methods are processes for mass polymerisation, emulsion polymerisation, suspension polymerisation and mass-suspension polymerisation. The usual additives may be used in the polymerisation. Examples of such substances are chain-length regulators, emulsifiers and compounds that supply free radicals. Such graft copolymers may be used per se but usually they are mixed with a copolymer of a vinylaromatic monomer, a vinyl-cyanide monomer and, optionally, a third monomer. This copolymer may have the same composition as the hard matrix of the graft copolymer but it may also differ from it.

The vinylaromatic compound in the polymer composition according to the invention is preferably selected from the group comprising styrene, α-methylstyrene and styrene derivatives which are substituted at the aromatic ring. Suitable substituents are halogens and alkyl groups with 1–8 carbon atoms. Optionally, a mixture of several of the aforementioned vinylaromatic compounds can be used. The vinyl cyanide is preferably selected from for example the group comprising acrylonitrile and methacrylonitrile. Suitable third monomers are for example methyl(meth)acrylate, ethyl(meth)acrylate, unsaturated dicarboxylic acids, $\alpha,\beta$-unsaturated dicarboxylic anhydrides such as maleic anhydrides and imide derivatives thereof such as maleimide and N-phenylmaleimide.

The rubber in the polymer composition according to the invention is selected from the known rubbers. Generally, these rubbers have a glass transition temperature of below $-10°$ C. Preferably, use is made of polybutadiene homopolymers or of butadiene copolymers with a butadiene content of 60–90 wt. %. If other dienes, such as isoprene or the lower alkyl esters of alkyl acid are used as a comonomer, the butadiene content of the rubber can be reduced to 30 wt. % without the mechanical properties of the graft copolymer being adversely affected.

Very suitable are the graft copolymer acrylonitrile-butadiene-styrene (ABS), acrylonitrile-styrene-acrylate (ASA) or an ethylene-propylene-diene rubber, polymerised with styrene and acrylonitrile (AES). Particularly suitable is the graft copolymer ABS.

The flame-retardant phosphorus compounds that can be used in the polymer composition according to the invention can be chosen from the known group of mono, bis and oligomeric polyphosphates. Monophosphates are described in for example EP-B-173856. The bis and oligomeric polyphosphates are phosphorus compounds that contain structural units according to any one of formulas I–III or mixtures thereof. See the formula sheet for formulas I–III. R1–R15 are hydrocarbon groups, which can be chosen independently of one another. There may optionally be an oxygen atom between the phosphorus molecule and the R groups; $q_1$ to $q_{15}$ are independently from one another 0 or 1; X1, X2 and X3 are halogens; m and r can be 0 or an integer chosen from 1 to 4; n and p can be an integer, chosen from 1 to 30. The hydrocarbon groups R1–R15 are halogenated if so desired. These bis and oligomeric polyphosphates are described in for example GB-A-2,043,083.

The flame-retardant phosphorus compounds may also be compounds that contain structural units according to formula IV. These compounds are the known metal or metalloid salts of a phosphonic acid. R is an alkyl group, whether or not branched, with 1–3 carbon atoms, whether or not substituted by several halogens or hydroxy groups. R' is hydrogen or an alkyl group with 1–3 carbon atoms. The metal or metalloid (M) is chosen from groups IIA, IIB, IIIA, IVA and VA of the Periodic Table; S is the valency of the metal or metalloid. The reader is referred to the formula sheet for formula IV too.

U.S. Pat. No. 4,973,727 describes the synthesis of metal salts and metalloid salts of (methyl methyl) phosphonic acid. It is also mentioned that these compounds are suitable as a flame-retardant component in mixtures containing other polymers. Examples of such polymers are acrylonitrile-butadiene-styrene copolymers, polycarbonates and polyphenylene oxides. The use of such phosphonates is also described in EP-A-343109.

Preferably, use is made of compounds of the group comprising phosphorus compounds with structural formula I, where n=1, and aluminium tri(monomethyl methyl phosphonate). More preferably, the flame-retardant phosphorus compound is selected from the group comprising hydroquinone bis(diphenylphosphate), resorcinol bis(diphenylphosphate) and aluminium tri(monomethyl methyl phosphonate). Within the scope of the invention use may also be made of the oligomeric or polymeric equivalents of these flame-retardant phosphorus compounds. If so desired, use may be made of a mixture of the aforementioned compounds.

Preferably, the flame-retardant phosphorus compound is used in amounts of 5-15 wt. %, in view of the required optimisation of the flame-retardant properties, the wt. % being relative to the total of the amounts of component (a), component (b), component (c) and the graft copolymer.

The charforming component which can be used in a polymer composition according to the invention are preferably selected from the group comprising novolak resins and polyphenylene ethers.

Novolak resins are mixtures of low-molecular-weight linear polymers of phenol and substituted phenols with formaldehyde and contain no free methylol groups. Such resins are described in the Encyclopedia of Polymer Science and Engineering, Vol. 11, pp. 45-95. Examples of substituted phenols are cresols, resorcinol, alkylated phenols such as p-tert-butylphenol and p-octylphenol and xylenols. Arylsubstituted phenols such as p-phenylphenol are also suitable. Preferably, use is made of phenol, cresol or resorcinol, or a mixture of these substances.

The polyphenylene ethers are commonly known and are described in, for example, U.S. Pat. Nos.3,306,874, 3,306,875 and 3,257,358. Use may also be made of polyphenylene ethers containing different monomeric units. Preferably, the charforming component is used in amounts of 0.1-25 wt. %, in particular 15-25 wt. %, in view of the desired optimisation of flame-retardant properties, the wt. % being relative to the total of the amounts of component (a), component (b), component (c) and the graft copolymer.

The polymer P that can be used in a polymer composition according to the invention comprises 1-100 wt. % monomeric units derived from vinylaromatic compounds which compounds are hydroxylated at the aromatic ring, the wt. % being relative to said polymer P. Such vinylaromatic alcohols have the following structure

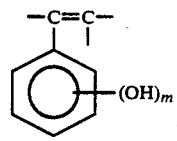

where m=1-5. Suitable monomers to be used for the preparation of polymer P can be selected from the group comprising o-, m- and p-hydroxystyrene, 2,4-dihydroxystyrene and 4-hydroxy-α-methylstyrene. The monomeric units in polymer P may be identical or can be derived from two or more different vinylaromatic alcohols. If polymer P comprises less than 1 wt. % of the monomeric units, the effect on the flame-retardant properties of the polymer composition according to the invention will be too small. Preferably, polymer P comprises 40-100 wt. % monomeric units, relative to said polymer P, in view of obtaining the best possible synergistic effect of polymer P on the flame-retardant properties. Very good flame-retardant properties are obtained if the monomeric unit in polymer P is derived from p-hydroxystyrene.

The polymer composition according to the invention can be obtained by mixing the individual components in a suitable, commonly known, mixing device. As mixing device use may be made of for example a batch kneader, a single- or twin-screw extruder or a static mixer.

Optionally, other polymers may be added to the polymer composition according to the invention. Examples of such polymers are polycarbonates, polyamides, polyesters, copolymers of a vinylaromatic monomer and an α,β-unsaturated dicarboxylic anhydride, which may optionally be entirely or partially imidated, and polycarboxylic acids. It has been found that the addition of other polymers to a polymer composition according to the invention has no effect on the synergism with respect to the flame-retardant properties between the charformer and polymer P. In particular the mixing of the polymer composition according to the invention with polycarbonate or a copolymer of styrene and maleic anhydride, which may optionally be entirely or partially imidated, results in a polymer blend with very good flame-retardant properties.

A very suitable polymer blend is obtained if, in addition to the polymer composition according to the invention, the polymer blend also contains 5-70 wt. % of a copolymer D, the wt. % being relative to the total of the amounts of component (a), component (b), component (c), the graft copolymer and copolymer D, which copolymer D consists of a vinylaromatic compound and an α,β-unsaturated dicarboxylic acid and/or anhydride, which may optionally be entirely or partially imidated. Particularly suitable for a polymer blend according to the invention is a copolymer D consisting of a styrene and/or α-methylstyrene and maleic acid and/or anhydride.

Optionally, the usual additives may be added to the polymer composition according to the invention. Examples of such additives are stabilisers, lubricants, kaolin, glass, pigments, organic or inorganic fillers or reinforcing agents.

The invention is further elucidated with the help of the following examples and comparative experiments, without being limited hereto.

EXAMPLES AND COMPARATIVE EXPERIMENTS

Examples I through IV

With the aid of a Brabender plasticorder a number of polymer compositions were prepared of acrylonitrilebutadiene-styrene (ABS, TZ 220, from DSM N.V.), styreneacrylonitrile copolymer (SAN, RY034, from DSM N.V.), styrene-maleic anhydride copolymer (SMA, 28% maleic anhydride, Mw=110,000 g/mole, from DSM N.V.), polyphenylene ether (PPO, from General Electric Co.), parahydroxypolystyrene (PHPS, from Maruzen Petrochemical Co. LTD.) and resorcinol bis(diphenylphosphate) (CR733S, from Daihachi). Tables 1, 2 and 3 show the mixing ratios in wt. %. In addition, flammability tests were carried out according to the UL94 V test (3.2 mm). Tables 1, 2 and 3 show the results of these tests.

Comparative experiments A through G

With the aid of a Brabender plasticorder a number of polymer compositions were prepared of acrylonitrilebutadiene-sytrene (ABS, TZ 220, from DSM N.V.), styreneacrylonitrile copolymer (SAN, RY034, from DSM N.V.), styrene-maleic anhydride copolymer (SMA, 28% maleic anhydride, $M_w$=110,000 g/mole, from DSM N.V.), polyphenylene ether (PPO, form General Electricl Co.), novolak phenolic resin (Durez 22091, from Occidental Chemicals), parahydroxypolystyrene (PHPS, from Maruzen Petrochemical co. LTD), resorcinol bis(diphenylphosphate) (CR733S, from Daihachi) and melamine (from DSM N.V.). Table 1 shows the mixing ratios in wt. %. In addition, flammability tests were carried out according to the UL94 V test (3.2 mm). Tables 1, 2 and 3 show the results of these tests.

TABLE 1

| Experiment | A | B | C | I |
|---|---|---|---|---|
| ABS | 30 | 30 | 30 | 30 |
| SAN | 40 | 40 | 40 | 40 |
| PHPS | 0 | 0 | 20 | 10 |
| PPO | 0 | 20 | 0 | 10 |
| Novolak | 10 | 0 | 0 | 0 |
| CR733S | 10 | 10 | 10 | 10 |
| Melamine | 10 | 0 | 0 | 0 |
| UL94 V test, 3.2 mm: | | | | |
| t1 | 160 | 111 | 153 | 10 |
| t2 | nr | nr | 15 | 39 |

(t1 = the burning time, in sec., after the first contact with the flame)
(t2 = the burning time, in sec., after the second contact with the flame)
(nr (= not relevant): after the first contact with the flame the specimen was found to be so burned that there was little sense in a second contact with the flame)

The mixing ratios of the components are expressed in wt. %.

Comparative experiment A relates to a polymer composition according to the state of the art. The burning time after the first contact with the flame is unacceptably high. Example I relates to a polymer composition according to the invention: a combination of the charformer and the PHPS results in an unexpectedly large reduction in the burning time after the first contact with the flame. Example B relates to a comparative experiment in which the flame-retardant effect of the charformer in the polymer composition was investigated. B shows that the addition of the charformer by itself does not result in sufficient flame-retardant properties: the burning time after the first contact with the flame is unacceptably high. Another comparative experiment was carried out to investigate to what extent such a reduction is the result of the flame-retardant effect of the PHPS (see C). Comparative experiment C shows that the addition of polymer P by itself does not result in a similar reduction in the burning time. It may be concluded that the observed reduction is the result of an unexpected positive synergism in flame-retardant effect between the charformer and polymer P.

TABLE 2

| exp. | D | E | II |
|---|---|---|---|
| ABS | 30 | 30 | 30 |
| SAN | 25 | 25 | 25 |
| SMA | 15 | 15 | 15 |
| PHPS | 20 | 0 | 10 |
| PPO | 0 | 20 | 10 |
| CR733S | 10 | 10 | 10 |
| UL94 V test, 3.2 mm: | | | |
| t1 | 53 | 80 | 11 |
| t2 | 5 | — | 19 |

(t1 = the burning time, in sec., after the first contact with the flame)
(t2 = the burning time, in sec., after the second contact with the flame)
(— = the specimen continued to burn for such a long time after the second contact with the flame that no further time measurements were carried out)

The mixing ratios of the components are expressed in wt. %.

Example II relates to a polymer composition according to the invention, to which an extra polymer has been added, viz. a SMA copolymer. Again a substantial reduction is observed in the burning time after the first contact with the flame: apparently the synergism between the charformer and polymer P is not affected by the addition of several polymers to the graft copolymer (compare with comparative experiments D and E). In addition, it is to be noted that the SMA copolymer affects the burning time after a second contact with the flame: this burning time is reduced by the SMA copolymer.

TABLE 3

| Exp. | F | III | IV | G |
|---|---|---|---|---|
| ABS | 30 | 30 | 30 | 30 |
| SAN | 15 | 15 | 15 | 15 |
| SMA | 15 | 15 | 15 | 15 |
| PPO | 30 | 20 | 10 | 0 |
| PHPS | 0 | 10 | 20 | 30 |
| CR733S | 10 | 10 | 10 | 10 |
| UL94 V test, 3.2 mm: | | | | |
| t1 | 23 | 8 | 10 | 26 |
| t2 | 52 | 12 | 8 | 4 |

(t1 = the burning time, in sec., after the first contact with the flame)
(t2 = the burning time, in sec., after the second contact with the flame)

The mixing ratios of the components are expressed in wt. %.

Table 3 also shows that the synergism of the charformer and polymer P results in a substantial reduction in the burning time after the first contact with the flame. This significant reduction is not obtainable with an increased amount of one of these components because such amounts involve undesired drawbacks. Increasing the amount of charformer to for example 30 wt. % results in a reduction in the burning time after the first contact with the flame (comparative exp. F), but such a large dosage of charformer causes an undesired deterioration of the processability of the polymer composition. Comparative experiment G shows that it is possible to obtain a reduction in the burning time after the first contact with the flame by adding large amounts of polymer P only, but such large amounts of polymer P cause substantial discolouration of the end product. This makes the polymer composition unsuitable for applications that require a particular color. With polymer compositions according to the invention (experiments III and IV) said side effects can be avoided, while improved flameretardant properties are obtained. Dependent on the desired flame-retardant properties of the end product, the amounts of charformer, phosphorus compound and polymer P can be chosen so that a V1 or even a V0 classification is obtained: a V0 classification was obtained with the polymer composition of example IV.

I claim:

1. Polymer composition comprising a copolymer of a vinylaromatic compound, a vinyl cyanide and, optionally, a third monomer which copolymer is grafted on a rubber, a flame-retardant phosphorus compound and a charforming component, characterised in that the polymer composition also comprises a polymer P which comprises 1-100wt. % monomeric units with the following structure, the monomeric unit wt. % being relative to the amount of said polymer P

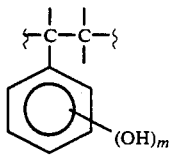

where m=1-5.

2. Polymer composition according to claim 1, characterised in that, in addition to the graft copolymer, the polymer composition comprises:
   (a) 0.1-25 wt. % flame-retardant phosphorus compound,
   (b) 0.1-30 wt. % carbon-forming component and
   (c) 0.1-40 wt. % polymer P,
the wt. % being relative to the total of the amounts of component (a), component (b), component (c) and the graft copolymer.

3. Polymer composition according to claim 1 characterised in that polymer P comprises 40-100 wt. % monomeric units with the following structure, the monomeric unit wt. % being relative to the amount of polymer P

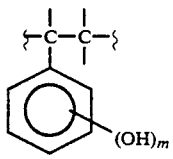

where m=1.14 5.

4. Polymer composition according to claim 1, characterised in that polymer P comprises monomeric units derived from p-hydroxystyrene.

5. Polymer composition according to claim 1, characterised in that the flame-retardant phosphorus compound is a monophosphate.

6. Polymer composition according to claim 1, wherein the flame-retardant phosphorus compound has the following structural formula I,

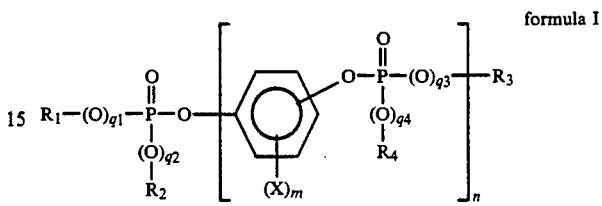

formula I where $R_1$ through $R_4$ are hydrocarbon groups, which may be identical or different,
X is a halogen,
m is 0 or an integer chosen from 1 to 4,
n is an integer chosen from 1 to 30
$q_1$ to $q_4$ are independently of one another 0 or 1.

7. Polymer composition according to claim 6, wherein the flame-retardant phosphorus compound has the following structural formula I,

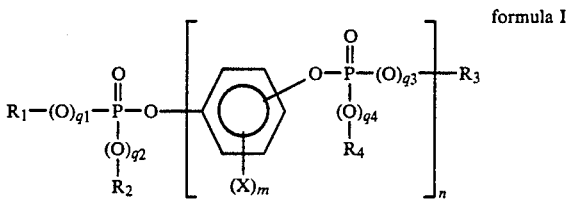

formula I where n=1.

8. Polymer composition according to claim 7, characterised in that the flame-retardant phosphorus compound is hydroquinone bis(dipehnylphosphate).

9. Polymer composition according to claim 7, characterised in that the flame-retardant phosphorus compound is resorcinol bis(diphenylphosphate).

10. Polymer composition according to claim 1, wherein the flame-retardant phosphorus compound has the following structural formula II,

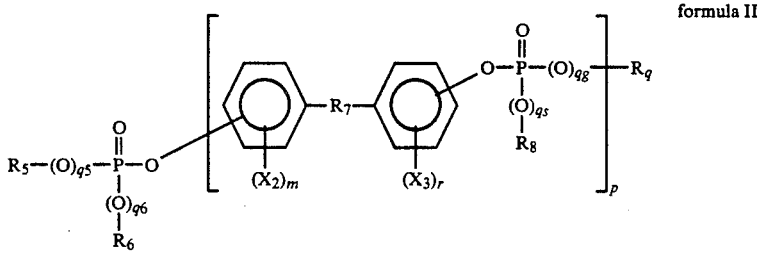

formula II where $r_5$ and $r_9$ are hydrocarbon groups, which may be identical or different,
$X_2$ and $X_3$ are halogens,
m and r are independently of one another 0 or an integer between 1 and 4,
p is an integer between 1 and 30 and
$q_5$ and $1_9$ are independently of one another 0 or 1.

11. Polymer composition according to claim 1, wherein the flame-retardant phosphorus compound has the following structural formula III,

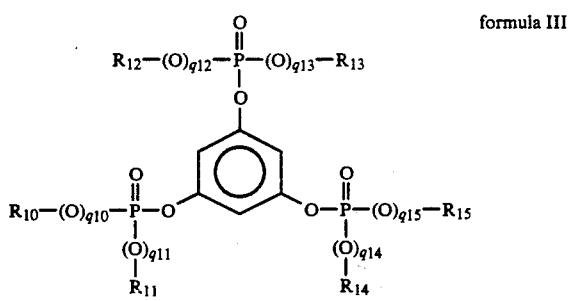

formula III where $r_{10}$ through $r_{15}$ are hydrocarbon groups, which may be identical or different, and where $q_{10}$ and $q_{15}$ are independently of one another 0 to 1.

12. Polymer composition according to claim 1, wherein the flame-retardant phosphorus compound has the following structural formula IV,

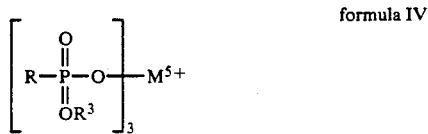

formula IV where R is an alkyl group of 1-3 C atoms, whether or not substituted by one or more halogens and/or hydroxy groups, R' is hydrogen or an alkyl group of 14 3 C atoms, M is a metal or metalloid from one of groups IIA, IIB, IIIA, IVA and/or VA of the Periodic Table, and S is the valency of said metal or metalloid.

13. Polymer composition according to claim 12, characterised in that the flame-retardant phosphorus compound is aluminium tri(monomethyl methyl phosphonate).

14. Polymer composition according to claim 1, characterised in that the flame-retardant phosphorus compound is a combination of at least two compounds selected from the group comprising hydroquinone bis(diphenylphosphate), resorcinol bis(diphenylphosphate) and aluminium tri(monomethyl methyl phosphonate).

15. Polymer composition according to claim 1, characterised in that the polymer composition contains 5-15 wt. % flame-retardant phosphorus compound, the wt. % being relative to the total of the amounts of component (a), component (b), component (c) and the graft copolymer.

16. Polymer composition according to claim 1, characterised in that the polymer composition contains 15-25 wt. % charforming component, the wt. % being relative to the total of the amounts of component (a), component (b), component (c) and the graft copolymer.

17. Polymer composition according to claim 1, characterised in that the charforming compound is a polyphenylene ether or a novolak phenolic resin or a combination of the two.

18. Polymer blend comprising a polymer composition according to claim 1 and a copolymer of a vinylaromatic compound and an $\alpha,\beta$-unsaturated dicarboxylic acid or a derivative thereof.

19. Polymer blend according to claim 18, characterised in that the copolymer is a copolymer of styrene and/or $\alpha$-methylstyrene and maleic acid and/or maleic anhydride.

* * * * *